United States Patent
Smith et al.

(10) Patent No.: US 11,827,230 B2
(45) Date of Patent: Nov. 28, 2023

(54) METHOD AND SYSTEM OF ANTI-CIRCUMVENTION MONITORING IN VEHICLE IGNITION INTERLOCK OPERATION

(71) Applicant: Consumer Safety Technology LLC, Des Moines, IA (US)

(72) Inventors: David Livingston Smith, Des Moines, IA (US); Carol A. Vokes, Adel, IA (US)

(73) Assignee: Consumer Safety Technology, LLC, Des Moines, IA (US)

( * ) Notice: Subject to any disclaimer, the term of this patent is extended or adjusted under 35 U.S.C. 154(b) by 154 days.

(21) Appl. No.: 17/217,572

(22) Filed: Mar. 30, 2021

(65) Prior Publication Data

US 2022/0315008 A1  Oct. 6, 2022

(51) Int. Cl.
*B60W 40/08* (2012.01)
*G07C 9/00* (2020.01)
*B60L 58/12* (2019.01)

(52) U.S. Cl.
CPC .............. *B60W 40/08* (2013.01); *B60L 58/12* (2019.02); *G07C 9/00182* (2013.01); *B60W 2040/0836* (2013.01); *G07C 2009/00285* (2013.01)

(58) Field of Classification Search
CPC ......... B60W 40/08; B60W 2040/0836; B60W 2050/0295; B60W 2556/45; B60W 50/0098; B60L 58/12; B60L 2240/547; B60L 2240/549; B60L 3/04;

(Continued)

(56) References Cited

U.S. PATENT DOCUMENTS

| 4,912,458 A | * | 3/1990 | Comeau | ............... B60K 28/063 340/576 |
| 5,426,415 A | | 6/1995 | Prachar et al. | |
| 6,167,746 B1 | | 1/2001 | Gammenthaler | |

(Continued)

FOREIGN PATENT DOCUMENTS

| CA | 2366341 | 5/2010 |
| WO | 1995026889 | 10/1995 |

OTHER PUBLICATIONS

Car_Batteries_and_Ignition_Interlock_Devices Mass._RMV_Lawyer_.pdf (Year: 2018).*

(Continued)

*Primary Examiner* — Thomas Ingram
*Assistant Examiner* — Faris Asim Shaikh
(74) *Attorney, Agent, or Firm* — Pauly, DeVries Smith & Deffner LLC

(57) ABSTRACT

A system and method of detecting an anti-circumvention attempt associated with an ignition interlock device of a vehicle. The method comprises detecting an electrical parameter associated with an electrical power state of the vehicle electrical system that includes the ignition interlock device having at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition, and reporting, responsive to the inferring, the IID circumvention event to a central monitoring server computing system.

18 Claims, 3 Drawing Sheets

(58) Field of Classification Search
CPC .............. B60L 3/0046; G07C 9/00182; G07C 2009/00285; B60K 28/063; B60R 25/00
See application file for complete search history.

(56) References Cited

U.S. PATENT DOCUMENTS

| | | | |
|---|---|---|---|
| 6,853,956 B2 | 2/2005 | Ballard et al. | |
| 6,930,466 B2* | 8/2005 | Bradley | H02J 7/007182 |
| | | | 320/133 |
| 6,956,484 B2 | 10/2005 | Crespo et al. | |
| 7,135,788 B2 | 11/2006 | Metlitzky et al. | |
| 8,078,334 B2 | 12/2011 | Goodrich | |
| 8,957,771 B2 | 2/2015 | Arringdale | |
| 9,442,103 B1 | 9/2016 | Goad | |
| 9,481,245 B2 | 11/2016 | Nelson et al. | |
| 9,707,845 B1* | 7/2017 | Nienhouse | B60K 28/063 |
| 9,908,488 B2 | 3/2018 | Shafer | |
| 10,919,389 B2 | 2/2021 | DeVries et al. | |
| 11,047,840 B2 | 6/2021 | DeVries et al. | |
| 11,787,415 | 10/2023 | Smith et al. | |
| 2007/0257642 A1* | 11/2007 | Xiao | H02J 7/00304 |
| | | | 320/134 |
| 2010/0314190 A1* | 12/2010 | Zimmermann | B60K 28/063 |
| | | | 180/272 |
| 2011/0148626 A1* | 6/2011 | Acevedo | G01S 19/42 |
| | | | 340/539.13 |
| 2012/0112879 A1* | 5/2012 | Ekchian | A61B 5/14546 |
| | | | 340/5.53 |
| 2012/0194141 A1* | 8/2012 | Shi | H02M 3/157 |
| | | | 320/137 |
| 2013/0177826 A1* | 7/2013 | Harris | H01M 8/04955 |
| | | | 429/428 |
| 2014/0253102 A1 | 9/2014 | Wood et al. | |
| 2015/0197151 A1* | 7/2015 | Ballard, Jr. | G01N 33/4972 |
| | | | 180/272 |
| 2015/0212063 A1* | 7/2015 | Wojcik | G06V 40/167 |
| | | | 340/576 |
| 2015/0244452 A1 | 8/2015 | Wojciech et al. | |
| 2016/0086021 A1 | 3/2016 | Grohman et al. | |
| 2016/0162849 A1 | 6/2016 | Matsuyama et al. | |
| 2017/0282713 A1 | 10/2017 | DeVries et al. | |
| 2017/0313189 A1 | 11/2017 | Walter et al. | |
| 2018/0011068 A1 | 1/2018 | Lyon | |
| 2018/0091930 A1* | 3/2018 | Jefferies | G07C 9/00571 |
| 2018/0101721 A1* | 4/2018 | Nienhouse | B60K 28/063 |
| 2018/0170207 A1 | 6/2018 | Ko | |
| 2018/0209955 A1 | 7/2018 | Moeller | |
| 2019/0246958 A1 | 8/2019 | Moeller et al. | |
| 2019/0376949 A1 | 12/2019 | Lyon | |
| 2020/0361314 A1 | 11/2020 | Ringgenberg et al. | |
| 2021/0148892 A1 | 5/2021 | Ruland et al. | |
| 2021/0156834 A1 | 5/2021 | DeVries et al. | |
| 2022/0142585 A1 | 5/2022 | Williams | |
| 2022/0142586 A1 | 5/2022 | Williams | |
| 2022/0365050 A1 | 11/2022 | Smith et al. | |
| 2023/0022836 A1 | 1/2023 | Smith et al. | |
| 2023/0028690 A1 | 1/2023 | Woods et al. | |

OTHER PUBLICATIONS

"Screenshots From Online Portal System For Users of Intoxalock Ignition Interlock Devices, captured Jan. 2018".
"Ignition Interlock Lockout Code Instructions," Smart Start LLC, https://www.smartstartinc.com/clients/lockout-code/, 2021 (4 pages).
"Notice of Allowance," for U.S. Appl. No. 17/960,010 dated Jun. 1, 2023 (17 pages).
"Smart Start Lockout Code Instructions & Customer Form," Smart Start LLC, https://www.smartstartinc.com/clients/lockoutcode, 2019 (3 pages).

* cited by examiner

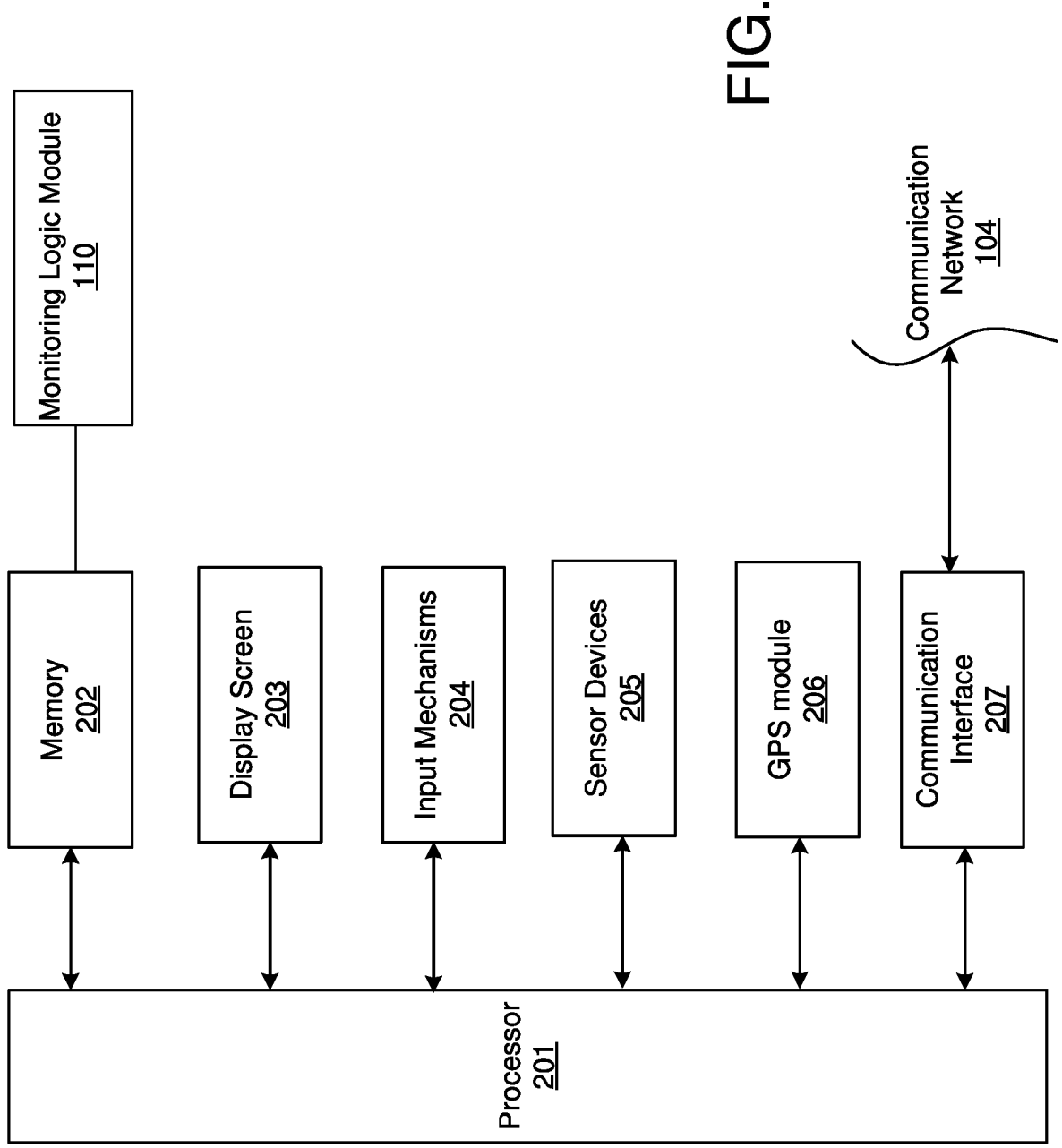

300

---

Detecting an electrical parameter associated with an electrical power state of a vehicle electrical system comprising an ignition interlock device (IID) that includes at least a relay device and a controller device electrically interconnected within the vehicle electrical system
310

↓

Comparing, responsive to the detecting, the electrical parameter to a threshold condition
320

↓

Inferring an IID circumvention event in accordance with the electrical parameter being either above or below the threshold condition.
330

↓

Reporting, responsive to the inferring, the IID circumvention event to a central monitoring server computing system
340

FIG. 3

METHOD AND SYSTEM OF ANTI-CIRCUMVENTION MONITORING IN VEHICLE IGNITION INTERLOCK OPERATION

TECHNICAL FIELD

The disclosure herein relates to vehicle ignition interlock systems and methods of operation thereof.

BACKGROUND

Vehicles can incorporate a breath alcohol ignition interlock device (IID) to prevent a driver from operating a vehicle while intoxicated with alcohol. Such devices are designed to prevent a driver from starting a motor vehicle when the driver's breath alcohol content (BrAC) is at or above a mandated alcohol concentration threshold. Various jurisdictions have adopted a law providing for use of such IID devices as a sanction for drivers convicted of driving while intoxicated, or as a condition of restoring driving privileges during some probationary period after such offenses. A typical IID device meets guidelines established by the National Highway Traffic Safety Administration (NHTSA) in published model specifications for IIDs, which specify various tests that such a device must pass to make it an effective and reliable deterrent to intoxicated driving.

Such a sanctioned driver is proscribed from attempting to circumvent functioning of the IID system in the manner intended, including, but not limited to, untimely and impermissible disconnection or modification of IID device and related system components of the vehicle. A circumvention attempt, once detected, can trigger automatic reporting of the IID circumvention attempt to an IID state agency charged with enforcing mandated IID usage.

BRIEF DESCRIPTION OF THE DRAWINGS

FIG. 2 illustrates, in one embodiment, an example architecture of a vehicle IID system incorporating anti-circumvention monitoring within a computing and communication system.

FIG. 3 illustrates, in an example embodiment, a method of anti-circumvention monitoring in deployment of a vehicle IID.

DETAILED DESCRIPTION

Figure 1:
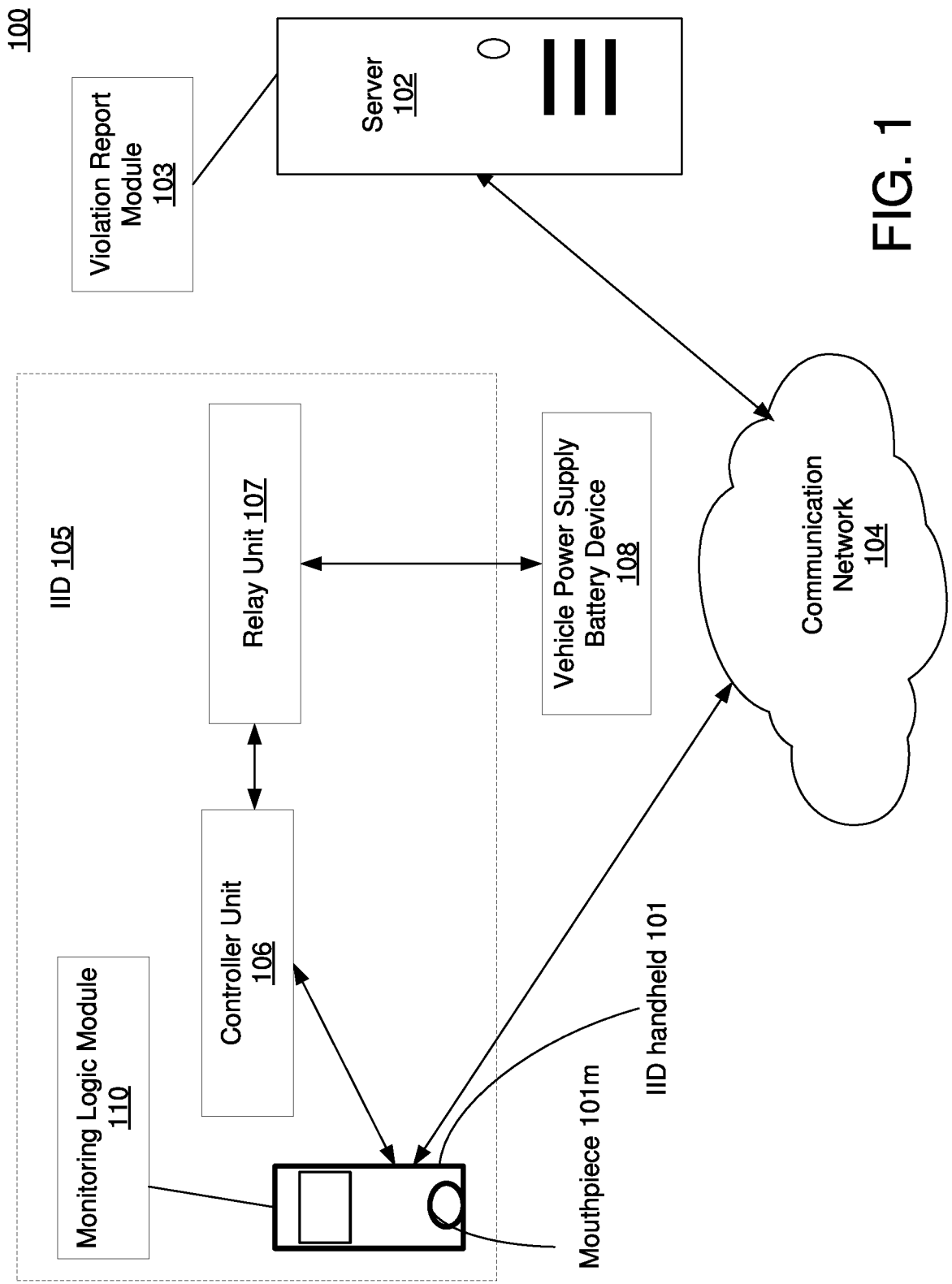
FIG. 1 illustrates, in an example embodiment, a vehicle IID system incorporating anti-circumvention monitoring within a computing and communication system.

Embodiments herein recognize that IID devices can be hacked or tampered with. For example, an impaired driver can attempt to alter or inhibit, such as by electrical or mechanical means, proper functioning of the IID device within a vehicle electrical system that incorporates the IID.

Among other benefits and technical effects, embodiments herein provide a method and system of deploying supervisory monitoring of alcohol impairment that is less subject to reports of driver violations that might be spuriously ascribed to a circumvention attempt, and more accurately notifying or alerting a monitoring remote server station of possible violations in a real-time basis with regard to a driver's mandated usage of an IID in accordance with probation conditions. Yet further, embodiments herein provide a method and system for immediate, real-time confirmation upon detecting an IID circumvention event in violation of an existing probation order that prohibits operation of a vehicle by an impaired driver.

Embodiments herein recognize that interruptions in vehicle power supply to an IID are typically detected for reporting to state authorities as being caused by a proscribed IID circumvention attempt, such circumvention attempt being ascribed to the driver subject to an IID mandate, and constituting a violation of such mandate. Embodiments herein provide for classifying and reporting only a subset of such detected vehicle power interruptions as constituting violations, advantageously avoiding, or minimizing, spurious reportings of violations that are likely to adversely affect a driver subject to the IID mandate.

Provided is a method of detecting an anti-circumvention attempt within a vehicle IID system. The method comprises detecting an electrical parameter associated with an electrical power state of a vehicle electrical system in a vehicle comprising an ignition interlock device that includes at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition, and reporting, responsive to the inferring, the IID circumvention event to a central monitoring server computing system.

In embodiments, the reporting includes, in conjunction with the IID circumvention event, IID account information associated with the IID. In other embodiments, the reporting can include reporting, to the central monitoring server computing system, the vehicle lockout state in conjunction with the IID account and a timestamp associated with the generating.

In some aspects, a vehicle lockout state can be generated at the IID, indicating or confirming that the vehicle is rendered inoperative based at least in part on the IID circumvention event.

In some embodiments, the electrical parameter comprises a rate of degradation associated with the electrical power state of the vehicle electrical system, where the vehicle electrical system includes a battery power supply source. In related embodiments, the electrical power state can be such as a voltage state and a current draw state of the battery.

The threshold condition can be such as a rate of degradation of the electrical power state that differentiates between a relatively instantaneous loss of electrical power and a more gradual loss thereof.

In some particular example embodiments, the more gradual loss of electrical power comprises a voltage degradation rate less than 1 volt per minute, and the relatively instantaneous loss of electrical power can be a voltage degradation rate exceeding 1 volt per second.

In embodiments, detecting the electrical parameter can be based, at least in part, on one or more analog to digital converter voltage sensors acquiring data indicating a voltage potential across opposite polarity terminals of the battery.

Also provided is an ignition interlock device (IID) including a processor and a non-transitory memory including instructions. The instructions when executed in the processor cause operations comprising detecting an electrical parameter associated with an electrical power state of a vehicle electrical system in a vehicle comprising the IID, the IID including at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition; and reporting, responsive to the inferring, the IID circumvention event to a central monitoring server computing system.

Further provided is a non-transitory computer readable memory storing instructions executable in a processor device. The instructions when executed in the processor cause operations comprising detecting an electrical parameter associated with an electrical power state of a vehicle electrical system in a vehicle comprising an ignition interlock device, the IID including at least a relay device and a controller device electrically interconnected within the vehicle electrical system; comparing, responsive to the detecting, the electrical parameter to a threshold condition; inferring an IID circumvention event in accordance with the electrical parameter being one of above and below the threshold condition; and reporting, responsive to the inferring, the IID circumvention event to a central monitoring server computing system.

Embodiments described herein can be implemented using programmatic modules, through the use of instructions that are executable by one or more processors. A programmatic module can include a program, a sub-routine, a portion of a program, or a software component or a hardware component capable of performing one or more stated tasks or functions. As used herein, a programmatic module can exist on a hardware component independently of other modules or components, or can be a shared element of other modules, programs or machines.

Some embodiments of IIDS described herein can generally incorporate computing and communication resources, such as processor and memory resources. Memory, processing, and network resources, local or remote but communicatively accessible, may be applied in connection with the establishment, use, or performance of any embodiment described herein, including with the performance of any method or with the implementation of any system.

One or more embodiments described herein provide that methods, techniques, and actions performed by an IID based monitoring device are performed programmatically, or as a computer-implemented method. Programmatically, as used herein, means through the use of code or computer-executable instructions. These instructions can be stored in one or more memory resources accessible to the IID based monitoring device.

Device and System

FIG. 1 illustrates, in an example embodiment, a vehicle IID system 100 incorporating anti-circumvention monitoring within a computing and communication system. IID handheld 101 includes a processor and a memory. The memory stores executable instructions, constituting monitoring logic module 110 for deploying IID handheld 101 in reporting a user violation, related to prohibition on driving a vehicle, to violation report module 103 of server computing device 102 via communication network 104. In variations, some portions, or all, of the executable instructions constituting monitoring logic module 110 may be hosted at violation report server 102 in communication with IID handheld 101 via communication network 104. Violation report module 103 of violation report server 102 includes logic related to storing IID and driver account details, including driver identification and history of usage of the IID associated with the particular driver and driver account. In some variations, violation report module 103 of violation report server 102 can be managed and maintained in deployment by an IID services provider, and allows reporting of driver and related IID violations to state authorities. In some embodiments herein, BrAC measurements from a user breath sample received at a mouthpiece 101m of IID handheld 101 can be correlated with blood alcohol content (BAC) levels, and a violation report can also be triggered based on either of a measured BrAC or a correlating BAC. It is contemplated that such BrAC and BAC correlations may be performed either locally at IID handheld 101 or at violation report server 102.

In one particular embodiment of IID 105 as depicted in FIG. 1, IID handheld 101 can be communicatively interfaced with controller unit 106 and relay unit 107. Relay unit 107 can directly interface with a vehicle engine ignition system in order to operationally disable the vehicle in response to BAC measurements being above the proscribed or mandated threshold level. Operational electrical power for some or all components of IID 105 as depicted can be sourced from vehicle power supply battery device 108. Although IID handheld 101, controller unit 106 and relay unit 107 are depicted in FIG. 1 as separate modules, it is contemplated that some or all functionality of the separate modules thereof can be integrated and physically incorporated into less than the 3 separate modules as illustrated. Furthermore the communication between one or more modules may be deployed using physically wired connections, wireless connections such as, but not necessarily limited to, Bluetooth, and any combination of wired and wireless communications. In one embodiment, IID 105 can be communicatively interfaced with the vehicle engine system via an on-board diagnostic (OBD) port using a wireless communication protocol such as, but not necessarily limited to, Bluetooth.

FIG. 2 illustrates, in one embodiment, example architecture 200 of a vehicle IID system 100 that incorporates anti-circumvention monitoring within a computing and communication system. In one embodiment, IID handheld 101 can include input mechanisms 204 such as resistive- or capacitance-based input mechanisms or software-implemented touchscreen input functionality, audible alerts capability, and sensor devices 205. Input mechanisms 204 may also include breath sample mouthpiece 101m to receive, at IID handheld 101, a breath sample submitted by a user. IID handheld 101 may also include capability for detecting and communicatively accessing wireless communication signals, including but not limited to any of Bluetooth, Wi-Fi, RFID, and global positioning system (GPS) signals, and incorporate communication interface 207 for communicatively coupling to communication network 104, such as by sending and receiving cellular and GPS data over data channels and voice channels. IID handheld 101 can incorporate GPS module 206 that includes GPS receiver and transmitter circuitry for accessing and enabling GPS signals and data.

Sensor devices 205 of IID handheld 101 can include an alcohol fuel cell sensor. Breath alcohol testing and monitoring devices are operated by a user blowing into a mouthpiece 101m of the device. The breath alcohol testing and monitoring device 101 incorporates an alcohol-sensing element such as a fuel cell sensor that measures alcohol content of the driver's breath, thereby providing an objective representation or estimate of the blood alcohol concentration of the driver's bloodstream. The monitoring device reads an electrical signal generated from the fuel cell, or similar alcohol-sensing element, and determines whether an operator's breath alcohol content exceeds some pre-designated threshold amount. If the operator's breath alcohol content does not exceed the threshold, the operator is determined as not intoxicated or impaired. If the breath sample delivered from the user registers a higher breath alcohol content than the predetermined allowable threshold, IID handheld 101 generates, records and reports an impaired driving violation.

Sensor devices 205 can further include digital imaging sensors for incorporating digital imaging capability at IID handheld 101.

Monitoring logic module 110 can be constituted of computer processor-executable code stored in memory 202 of IID handheld 101 for deploying functionality ascribed to embodiments herein. In one variation, monitoring logic module 110 may be stored in memory 202 upon subsequent accessing and downloading, via communication network 104, from violation report server 102 or other third party remote server.

In particular embodiments, monitoring logic module 110 includes instructions executable in processor 210 to detect an electrical parameter associated with an electrical power state of a vehicle electrical system in a vehicle comprising an ignition interlock device 105 that includes at least a relay device and a controller device electrically interconnected within the vehicle electrical system.

In embodiments, the vehicle electrical system can include a battery as a vehicle power source, and the electrical power state can be either, or a combination, of a voltage state and a current draw state as measured, or otherwise indicated, across the battery terminals. In some embodiments, the electrical parameter can be a rate of degradation associated with the electrical power state, determined in accordance with the voltage state or current draw state changes of the vehicle electrical system over a given time duration.

In some embodiments, the detecting can be based at least in part on one or more analog to digital converter voltage sensors acquiring data associated with a voltage potential or current draw state of the vehicle electrical system or any component subset thereof, as powered by vehicle power supply battery device 108.

In embodiments, the electrical parameter can be a rate of degradation rate of a voltage loss or a current draw condition as measured in relation to the vehicle power supply battery device 108 (also referred to herein as battery 108).

Monitoring logic module 110 further includes executable instructions to compare, responsive to the detecting, the electrical parameter to a threshold condition. In embodiments, the threshold condition can be stored in memory 202 of IID handheld 101. In alternate embodiments, the threshold condition can be stored in a memory of violation report server 102.

The threshold condition can be a predetermined value of a degradation rate of a voltage loss or a current draw condition in relation with vehicle power supply battery 108. In principle, the threshold condition can be established as a rate of degradation of the electrical power state that differentiates between a relatively instantaneous loss of electrical power and a more gradual loss thereof.

Monitoring logic module 110 also includes executable instructions to infer an IID circumvention event in accordance with the electrical parameter being either above or below the threshold condition. A more instantaneous loss of IID or vehicle power can be indicative of an attempted or successful disablement of the IID with the vehicle system. In contrast, a relatively gradual loss of vehicle or IID electrical power can be attributed to causes other than a circumvention attempt via driver-initiated disablement, due to, but not necessarily limited to, older and partially malfunctioning components of the vehicle electrical system, and even from extreme prevailing weather conditions.

In some example embodiments, when the voltage potential is sampled at a rate of every 30 seconds or more frequently, the more gradual loss of electrical power comprises a voltage degradation rate less than 1 volt per minute, and the relatively instantaneous loss of electrical power comprises a voltage degradation rate exceeding 1 volt per second. In other embodiments, the threshold condition may not be fixed, but can be dynamically determined and adjusted, for instance across different voltage ranges being attained or crossed during a degradation in voltage potential as measured across the terminals of vehicle power supply battery 108. The different voltage ranges, in some embodiments, can range from, but not necessarily limited to, 12V to 9V, and from 9V to under 9V.

Monitoring logic module 110 also includes executable instructions to report, responsive to the inferring, the IID circumvention event to a central monitoring server computing system.

In additional embodiments, the reporting can include, in conjunction with the IID circumvention event, IID account information associated with the IID. In addition variations, the reporting to the central monitoring server computing system can also include establishment of a vehicle lockout state in conjunction with the IID account and a timestamp indicating an event time associated with generating the lockout state. The vehicle lockout state can indicate or confirm that the vehicle is rendered inoperative based at least in part on the IID circumvention event. In some embodiments, the reporting is generated via the IID. The central monitoring server can be maintained at an IID provider service or a state monitoring authority, in embodiments.

Methodology

FIG. 3 illustrates, in an example embodiment, method 300 of anti-circumvention monitoring in deployment of a vehicle IID within a computing and communication system. Examples of method steps described herein are related to deployment and use of IID handheld 101 as described herein. According to one embodiment, the techniques are performed in processor 201 executing one or more sequences of software logic instructions that constitute monitoring logic module 110 of IID handheld 101. In embodiments, monitoring logic module 110 may be remotely hosted at violation report server 102, also referred to herein as server 102, and is communicatively coupled with IID handheld 101. Such instructions may be read into memory 202 from machine-readable medium, such as memory storage devices. Executing the instructions of monitoring logic module 110 stored in memory 202 causes processor 201 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, detecting an electrical parameter associated with an electrical power state of vehicle electrical system in a vehicle comprising an ignition interlock device 105 that includes at least a relay device and a controller device electrically interconnected within the vehicle electrical system.

In embodiments, the vehicle electrical system can include a battery as a vehicle power source, and the electrical power state can be either, or a combination, of a voltage state and a current draw state as measured, or otherwise indicated, across the battery terminals. In some embodiments, the electrical parameter can be a rate of degradation associated with the electrical power state, determined in accordance with the voltage state or current draw state changes of the vehicle electrical system over a given time duration.

In some embodiments, the detecting can be based at least in part on one or more analog to digital converter voltage sensors acquiring data associated with a voltage potential or current draw state of the vehicle electrical system or any component subset thereof, as powered by the vehicle battery power supply.

In embodiments, the electrical parameter can be a rate of degradation rate of a voltage loss or a current draw condition as measured in relation to the vehicle power supply battery device 108 (also referred to herein as battery 108).

At step 320, comparing, responsive to the detecting, the electrical parameter to a threshold condition. In embodiments, the threshold condition can be stored in memory 202 of IID handheld 101. In alternate embodiments, the threshold condition can be stored in a memory of violation report server 102.

The threshold condition can be a predetermined value of a degradation rate of a voltage loss or a current draw condition in relation with vehicle power supply battery 108. In principle, the threshold condition can be established as a rate of degradation of the electrical power state that differentiates between a relatively instantaneous loss of electrical power and a more gradual loss thereof.

At step 330, inferring an IID circumvention event in accordance with the electrical parameter being either above or below the threshold condition. In one embodiment, a more instantaneous loss of IID or vehicle power can be indicative of an attempted or successful disablement of the IID with the vehicle system. On the other hand, a relatively gradual loss of vehicle or IID electrical power can be attributed to causes other than a circumvention attempt via driver-initiated disablement, due to, but not necessarily limited to, older and partially malfunctioning components of the vehicle electrical system, and even from extreme prevailing weather conditions.

In some example embodiments, when the voltage potential is sampled at a rate of every 30 seconds or more frequently, the more gradual loss of electrical power comprises a voltage degradation rate less than 1 volt per minute, and the relatively instantaneous loss of electrical power comprises a voltage degradation rate exceeding 1 volt per second. In other embodiments, the threshold condition may not be fixed, but can be dynamically determined and adjusted, for instance across different voltage ranges being attained or crossed during a degradation in voltage potential as measured across the terminals of vehicle power supply battery 108. The different voltage ranges, in some embodiments, can range from, but not necessarily limited to, 12V to 9V, and from 9V to under 9V.

At step 340, reporting, responsive to the inferring, the IID circumvention event to a central monitoring server computing system 102 (also referred to herein as server 102).

In additional embodiments, the reporting can include, in conjunction with the IID circumvention event, IID account information associated with the IID. In addition variations, the reporting to the central monitoring server computing system can also include establishment of a vehicle lockout state in conjunction with the IID account and a timestamp indicating an event time associated with generating the lockout state. The vehicle lockout state can indicate or confirm that the vehicle is rendered inoperative based at least in part on the IID circumvention event. In some embodiments, the reporting is generated via the IID. The central monitoring server can be maintained at an IID provider service or a state monitoring authority, in embodiments.

In another aspect, the reporting to the central monitoring server computing system can also relate to commencing a timed countdown to vehicle lockout state in conjunction with the IID account and a timestamp indicating an event time associated with the vehicle lockout state. In one embodiment, the timed countdown can occur over, for instance, over a three day period during the vehicle operator is notified of an impending lockout, where the impending vehicle lockout state can indicate that the vehicle will be rendered inoperative based at least in part on the IID circumvention event. In some embodiments, the reporting is generated via the IID. The central monitoring server can be maintained at an IID provider service or a state monitoring authority, in embodiments. In this manner, based on classifying a vehicle power loss event as relatively sudden versus pronouncedly gradual in accordance with the threshold condition of voltage degradation rate, embodiments trigger reporting only a subset of detected vehicle power interruptions as constituting IID circumvention violations, advantageously avoiding, or minimizing, spurious reporting of violations that are likely to adversely affect a driver subject to the IID mandate. In particular embodiments, sudden losses of vehicle power are associated with and reported as an IID circumvention violation, whereas in contrast more gradual vehicle power loss that is detected as occurring at a slower or lesser rate than a threshold condition of voltage degradation rate does not trigger a violation report as being caused by an IID circumvention event.

In another variation, violation report server device 102, includes a processor and a non-transitory memory including instructions for triggering the vehicle countdown state based on a report of an IID circumvention attempt transmitted from the vehicle IID in accordance with embodiments herein.

It is contemplated for embodiments described herein to extend to individual elements and concepts described herein, independently of other concepts, ideas or system, as well as for embodiments to include combinations of elements recited anywhere in this application. For example, although techniques of anti-circumvention monitoring described herein are disclosed in context of alcohol sensor devices and alcohol impaired driving, it is contemplated that such techniques, in conjunction with appropriate, respective sensor devices, be applied to alternate intoxicant agents that result in impaired driving. Such intoxicants can include, but not necessarily be limited to, drugs including cannabinoids, opiates, and methamphetamines.

Although embodiments are described in detail herein with reference to the accompanying drawings, it is contemplated that the disclosure herein is not limited to only such literal embodiments. As such, many modifications including variations in sequence of the method steps in conjunction with varying combinations of user interface features disclosed herein will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments. Thus, the absence of describing combinations of such do not preclude the inventor from claiming rights to such combinations.

What is claimed is:

1. A method performed in a processor, the method comprising:
    detecting an electrical power state of a vehicle electrical system in a vehicle comprising an ignition interlock device (IID) that includes at least a relay device and a controller device electrically interconnected within the vehicle electrical system, wherein the electrical power state comprises one of a voltage state and a current draw state of the vehicle electrical system;
    measuring a rate of degradation of the electrical power state;
    comparing the measured rate of degradation of the electrical power state to a threshold rate of degradation;
    inferring an IID circumvention event in accordance with the measured rate of degradation being above the threshold rate of degradation;
    reporting, responsive to the inferring, the IID circumvention event to a central monitoring server computing system; and
    initiating, responsive to the inferring, a timed countdown to a vehicle lockout state, wherein the vehicle is rendered inoperable at the end of the timed countdown.

2. The method of claim 1 further comprising reporting, in conjunction with the IID circumvention event, IID account information associated with the IID.

3. The method of claim 1 wherein the timed countdown spans at least a three-day period.

4. The method of claim 3 further comprising reporting, to the central monitoring server computing system, the vehicle lockout state in conjunction with the IID account and a timestamp associated with the generating.

5. The method of claim 1 wherein the vehicle electrical system comprises a battery and the electrical power state comprises one of a voltage state and a current draw state of the battery.

6. The method of claim 5 further comprising not inferring an IID circumvention event in accordance with the measured rate of degradation being below the threshold rate of degradation.

7. The method of claim 5 wherein the detecting is based at least in part on at least one analog to digital converter voltage sensor acquiring data associated with a voltage potential across opposite polarity terminals of the battery.

8. The method of claim 1 wherein the vehicle electrical system comprises a battery and the electrical power state is a voltage potential of the battery.

9. The method of claim 8 wherein the voltage potential detected at least once every 30 seconds and the rate of degradation is measured by comparing the successively measured voltage potentials.

10. The method of claim 9 wherein the threshold rate of degradation is a voltage degradation rate of 1 volt per minute.

11. The method of claim 1 wherein the threshold rate of degradation is dynamically adjusted based on the electrical power state.

12. An ignition interlock device (IID) comprising:
    a processor; and
    a non-transitory memory including instructions, the instructions when executed in the processor causing operations comprising:
        detecting an electrical power state of a vehicle electrical system in a vehicle comprising an ignition interlock device (IID) that includes at least a relay device and a controller device electrically interconnected within the vehicle electrical system, wherein the electrical power state comprises one of a voltage state and a current draw state of the vehicle electrical system;
        measuring a rate of degradation of the electrical power state;
        comparing the measured rate of degradation of the electrical power state to a threshold rate of degradation;
        inferring an IID circumvention event in accordance with the measured rate of degradation being above the threshold rate of degradation;
        reporting, responsive to the inferring, the IID circumvention event to a central monitoring server computing system; and
        initiating, responsive to the inferring, a timed countdown to a vehicle lockout state, wherein the vehicle is rendered inoperable at the end of the timed countdown.

13. The ignition interlock device of claim 12 further comprising instructions causing operations including reporting, in conjunction with the IID circumvention event, IID account information associated with the IID.

14. The ignition interlock device of claim 12 wherein the timed countdown spans at least a three-day period.

15. The ignition interlock device of claim 14 further comprising instructions causing operations including reporting, to the central monitoring server computing system, the vehicle lockout state in conjunction with the IID account and a timestamp associated with the generating.

16. The ignition interlock device of claim 12 wherein the vehicle electrical system comprises a battery and the electrical power state comprises one of a voltage state and a current draw state of the battery.

17. The ignition interlock device of claim 16 further comprising not inferring an IID circumvention event in accordance with the measured rate of degradation being below the threshold rate of degradation.

18. A non-transitory computer readable memory storing instructions executable in a processor device, the instructions when executed in the processor causing operations comprising:
    detecting an electrical power state of a vehicle electrical system in a vehicle comprising an ignition interlock device (IID) that includes at least a relay device and a controller device electrically interconnected within the vehicle electrical system, wherein the electrical power state comprises one of a voltage state and a current draw state of the vehicle electrical system;
    measuring a rate of degradation of the electrical power state;
    comparing the measured rate of degradation of the electrical power state to a threshold rate of degradation;
    inferring an IID circumvention event in accordance with the measured rate of degradation being above the threshold rate of degradation;
    reporting, responsive to the inferring, the IID circumvention event to a central monitoring server computing system; and
    initiating, responsive to the inferring, a timed countdown to a vehicle lockout state, wherein the vehicle is rendered inoperable at the end of the timed countdown.

* * * * *